United States Patent

Zipper

[15] 3,689,625
[45] Sept. 5, 1972

[54] METHOD OF FORMING A MOLDED RING GASKET

[72] Inventor: Donald H. Zipper, Western Springs, Ill.

[73] Assignee: Continental Can Company, New York, N.Y.

[22] Filed: June 12, 1969

[21] Appl. No.: 871,109

Related U.S. Application Data

[62] Division of Ser. No. 750,628, Aug. 6, 1968, Pat. No. 3,473,683.

[52] U.S. Cl. .............................. 264/268, 18/DIG. 47
[51] Int. Cl. .............................................. B29c 13/02
[58] Field of Search ................... 264/268; 18/DIG. 18

[56] References Cited

UNITED STATES PATENTS 3,004,298  10/1961  Haynie ................. 18/DIG. 47

FOREIGN PATENTS OR APPLICATIONS 984,032  2/1965  Great Britain ........ 18/DIG. 47

Primary Examiner—Robert F. White
Assistant Examiner—Richard H. Shear
Attorney—Greist, Lockwood, Greenawalt & Dewey

[57] ABSTRACT

A punch for forming a closure gasket which includes at least two annular grooves, each having a land radially inwardly thereof, a plurality of inwardly extending notches in the lands and extending between the grooves, and generally radially and generally axially facing surfaces disposed outwardly of the grooves for forming a gasket along and inwardly of the skirt portion of a closure. The method includes disposing gasket forming compound on the inner surface of the skirt of a cap shell, moving a punch into a gasket channel of the shell to form a gasket, and allowing air entrapped with the compound to escape radially inwardly of the punch while directing excess gasket compound into a plurality of concentric rings. The closure comprises a cap shell with a gasket having sealing surfaces disposed on the skirt and in a gasket channel just inwardly of the skirt, and excess gasket forming compound disposed in a plurality of rings just inside the channel. The top panel center portion of the closure, and the spaces adjacent the rings, preferably are free of compound or contain not more than relatively thin or intermittent deposits of gasket forming compound.

4 Claims, 5 Drawing Figures

PATENTED SEP 5 1972 3,689,625
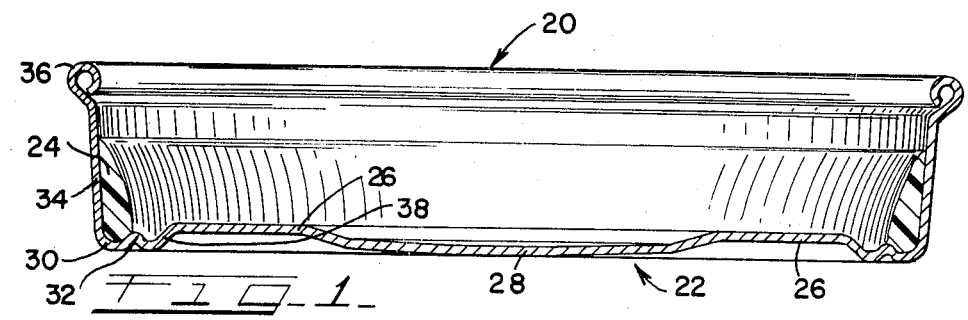
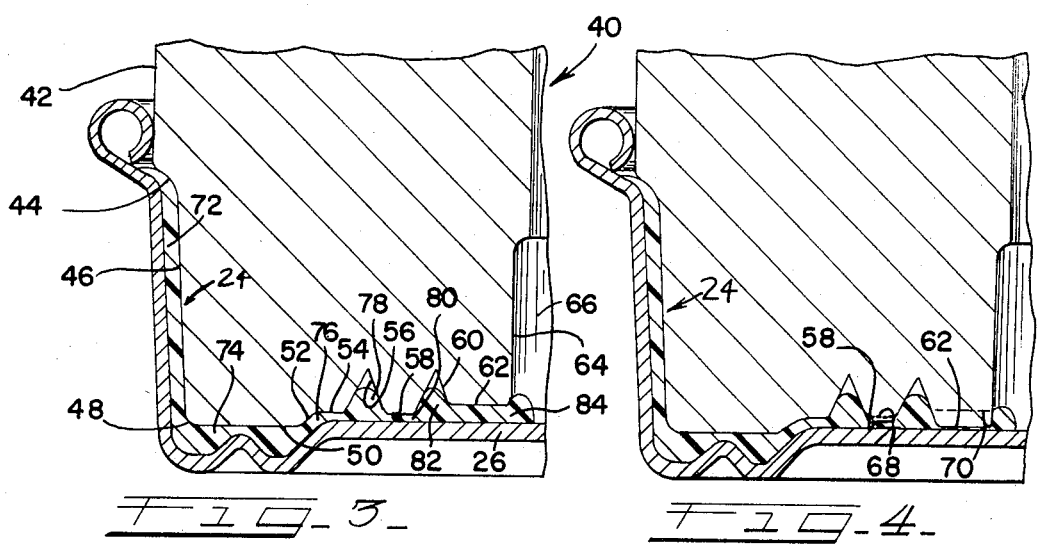
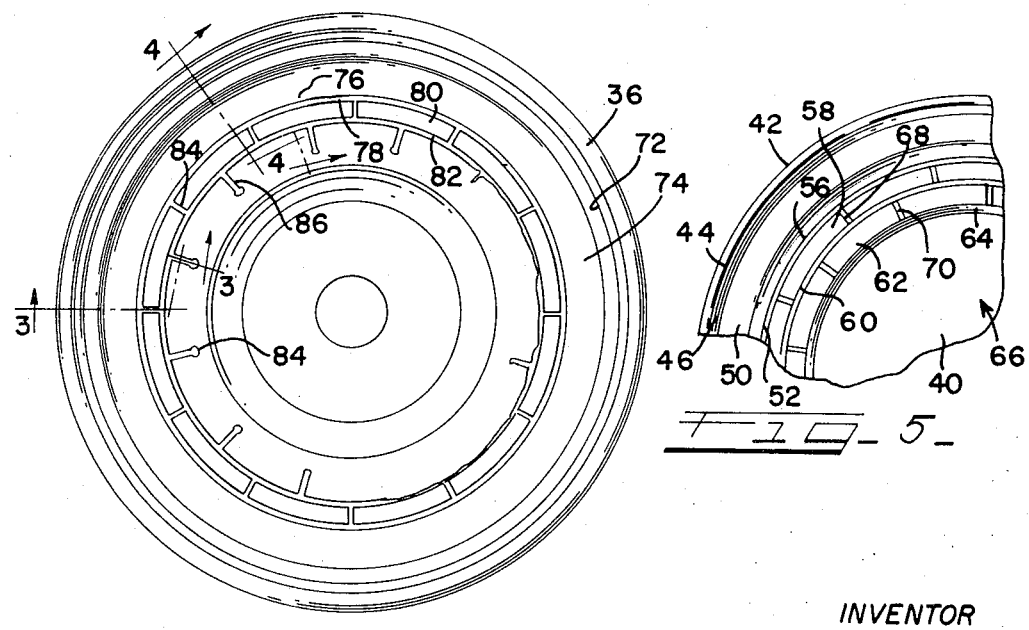
INVENTOR
DONALD H. ZIPPER
BY Greist, Lockwood, Greenawalt
& Dewey ATT'YS.

METHOD OF FORMING A MOLDED RING GASKET

This application is a division of application Ser. No. 750,628, filed Aug. 6, 1968, now U.S. Pat. No. 3,473,683, issued Oct. 21, 1969.

BACKGROUND OF THE INVENTION

1. Field of the Invention

The field of the invention is that of closures with molded sealing gaskets therein, and methods and apparatus for making such closures. More particularly, the field of the invention is that of apparatus and methods for manufacturing closures having plastisol or like gaskets therein, particularly closures which may be pressed onto a threaded jar neck. In these closures, subsequent cold flow, reformation or reflow of the plastisol causes the gasket compound to form mating surfaces with the jar neck, thereby forming a closure which is locked in place atop a jar without intentional rotation, and which may be removed from the jar only by rotation.

More particularly the field is that of jar closures and manufacturing methods therefor, wherein the amount of gasket-forming or sealing compound comprising the gasket need not be precisely measured, and wherein the compound need not be disposed in a precise location within the closure. In these methods, the gasket compound may be spread evenly over the desired areas of the closure without having excess compound accumulate in undesired locations, to cause excessive air entrapment, pockmarks or risk of closure failure, or to present an appearance which is esthetically undesireable to the consumer.

The field of the invention is also particularly that of apparatus for molding gaskets in which the molding punch or die is arranged to cooperate with the closures shells so as to cause deposition of gasket compound within the closure shells in particular areas, merely by properly positioning the punch, and, after deposition of compound, moving the punch axially into position within the closure. For example, the invention is useful in producing improved jar and bottle caps for diverse end uses, such as hermetic or vacuum sealing of specially prepared foods, food products, and the like.

2. Description of the Prior Art

Closures such as jar and bottle caps, with which the present invention is concerned, in addition to ordinary jars or bottles, include those of a type sometimes referred to as press-on, turn-off caps, described for example, in the Foster et al. U.S. Pat. No. 3,270,904. These caps generally include a top panel portion which is not necessarily desired to be covered with substantial amounts of sealing compound or gasket material. These caps also normally include other interior and exterior protective coatings, a channel portion for receiving that portion of the gasket which is adapted to engage the upwardly or axially facing top seal finish of a container neck, and a skirt portion which is adapted to receive the inwardly facing portion of the gasket which engages the side seal finish of a container.

Such closure caps may be made generally according to the method set forth in the Foster et al. Patent. Caps having gaskets without substantial skirt portions may be made by a method such as that described in the Owen U.S. Pat. No. 3,360,148. This patent is directed to a method having the object of eliminating undesirable accummulations of gasket material on certain surfaces of the cap, and provides for localizing such material in single ring or bead inside the principal gasket channel. Caps and methods such as those described in the patents referred to above have a number of advantages, and have achieved significant commercial success.

However, manufacturing experience with such caps has shown that, particularly when a molded gasket is formed which includes a portion extending substantially axially along the skirt as well as into a channel around the outer periphery or margin of the top panel, the amount of compound required is such that the compound must be placed or deposited along a skirt at a point somewhat spaced apart from the channel. That is, in the ordinary method of forming a gasket, with the cap in the inverted position, the gasket forming compound must be applied at a point along the skirt which is spaced upwardly from the channel.

For example, the Owen Patent shows a cap construction in which the significant sealing surface is in the area near the channel which receives the sealing compound, and shows that the skirt member does not participate in the sealing action. However, in the case of the caps referred to herein it is desirable to place a gasket therein which extends a substantial height along the skirt portion, that is, a gasket such as that shown in the Foster Patent is desired. Since the compound is normally deposited in a highly viscous state, it will not immediately run down into the channel or groove. However, since the compound does run down to a certain extent, moving a molding punch or die into the molding position tends to entrap air with the compound moving down the sidewall or skirt portion.

The air which is trapped with the compound and swept inwardly as the punch moves into position remains in or near the compound, and, upon curing thereof, causes void or pockmarks in the gasket seal area near the bottom of the skirt and in the gasket channel of the closure.

With a punch design which allows free movement of air radially inwardly toward the center of the cap, a pockmark-free gasket can be made, but two serious drawbacks are present in such a method. First, the punch must be perfectly centered, and second, the amount of compound must be precisely measured and perfectly distributed so that there is no excess compound present over and above that required to form the gasket; otherwise, the excess will be moved into the center of the cap, forming an irregular mass of compound at a random position.

Thus, although prior art methods permit rapid and reliable operation, there is still room for improvement in methods and apparatus which will further increase operating speed potential, which will decrease the percentage of rejects or unsatisfactory closures, and which are less critical as to accuracy of metering compound into precisely desired areas, and as to methods of manipulating a forming punch so as to move it concentrically of a cap at high speeds in order to achieve outstanding results. Likewise, the prior art has not completely overcome the disadvantage of entrapped air causing voids or pockmarks in a portion of a gasket which is desired to be used as a sealing surface, particularly in the environment where a gasket is formed which is disposed along a cap skirt to a substantial extent, as well as within the channel portion of such cap.

SUMMARY OF THE INVENTION

Accordingly, in view of improvements desired in prior art closures, methods, and apparatus, an object of the present invention is to provide an improved cap characterized by outstanding sealing characteristics and an esthetically pleasing appearance.

A further object of the invention is to provide a method of manufacturing a closure having gasket surfaces on the skirt portion and on the outer margin of the top panel which includes moving a punch downwardly into a cap having sealing compound distributed about the skirt, and forcing excess compound and air entrapped therewith circumferentially within the cap portion, then venting the air and additional compound radially inwardly, and further directing it circumferentially to form one or more additional concentric rings of compound.

Another object is to provide a cap in which sufficient gasket material is provided to form the required sealing surfaces, and in which the excess gasket material is disposed in a uniform and esthetic manner radially inwardly of the outer edge portions of the cap.

A further object of the invention is to provide a cap which includes generally axially and generally radially facing sealing surfaces and which includes gasket compound disposed in at least two concentric, spaced apart rings disposed radially inwardly of the outer cap edge.

A still further object of the invention is to provide a method of distributing sealing compound within the shell of a cap member to form a gasket closure which includes the steps of bleeding or venting entrapped air radially inwardly of the closure, and simultaneously directing excess compound into two or more circumferentially extending rings.

A still further object of the invention is to provide a molding punch which includes axially and radially facing surfaces for forming a gasket within a closure member, a plurality of lands defining concentric grooves, notches in the lands for venting air between grooves, and in which the grooves serve to distribute the sealing compound into circumferentially extending, concentric rings inside a jar or the like.

The present invention achieves these objects, and other objects inherent therein, by providing a closure with a top panel, an outer margin portion and a skirt depending therefrom, and a sealing gasket adhered to and disposed inside the skirt and margin portion, in which excess gasket compound is formed into a plurality of concentrically disposed rings inside the outer margin, the rings being spaced apart from each other and having webs of gasket forming compound extending therebetween. The invention also achieves its objects by providing a method and apparatus for venting excess sealing compound and air entrapped therewith radially inwardly of the gasket of surfaces by providing a series of notched grooves which allow escape or venting of excess sealing compound from the channel and direct it into a plurality of concentric rings.

The exact manner in which this invention achieves its objects, and others which are inherent therein, will become more apparent when considered in conjunction with the following detailed description of the preferred embodiments of the invention, and as shown in the drawings, in which like reference numbers indicate corresponding parts throughout.

BRIEF DESCRIPTION OF THE DRAWINGS

FIG. 1 is a vertical sectional view of a cap shell disposed in an inverted position with gasket forming deposited therein before forming or shaping the gasket member;

FIG. 2 is a plan view of the inner surface of a gasketed closure made according to the present invention;

FIG. 3 is a vertical sectional view, with portions broken away, taken along lines 3—3 of FIG. 2, showing the moving punch forming the gasket in the closure;

FIG. 4 is a vertical sectional view, taken along lines 4—4 of FIG. 2, showing a different aspect of the molding punch in position within the cap shell unit;

FIG. 5 is a plan view, with portions broken away, showing the axial end face of the molding punch of the invention.

DESCRIPTION OF THE PREFERRED EMBODIMENTS OF THE INVENTION

Although it will be understood that the present invention may be practiced in a number of forms, the invention will be described by reference to a gasketed cap or closure assembly adapted to be pressed onto a jar or bottle, such as a baby food jar, without intentional rotation thereof, and adapted to be removed therefrom by twisting motion. However, the invention is useful with other types of caps and closures, which will be appreciated by those skilled in the art. It will be understood, in reference to the detailed description, that it is customary to form the gasket placed within the closure when the closure is in a position of use which is inverted with respect to its normal position on top of a container. That is, during manufacture, the top panel is disposed downwardly and the skirt portion extends upwardly therefrom, whereas, in use, the top panel of the cap has the skirt extending downwardly therefrom.

Referring now to the drawings in greater detail, FIG. 1 shows the closure unit 20 after formation of the exterior metal cap portion 22, but before the gasket forming sealing compound 24 is in a desired configuration, and before molding thereof. The metal cap comprises an end panel 26, which may include a partially domed center or button 28, which may be adapted to display the condition of vacuum or pressure which is within the container, a circumferentially extending channel 30 container one or more re-entrants 32, and a skirt portion 34 which terminates in a rolled bead portion 36. An axially offset flange or shoulder 38, in combination with the skirt 34, defines the channel 30, which may be considered as an outer margin of the end panel 26. The re-entrant 34 is preferred but not necessary to the invention. The channel 30 is thus axially offset from the principal surface of the cap portion 26, so the compound 24 forming the gasket may be confined therein.

As shown in FIG. 1, the cap is disposed in position with the inner surface thereof extending upwardly, with compound 24 disposed in a generally uniform ring or bead along the skirt portion 34 of the cap. The method of depositing this compound is well known in the art, and typically consists of injecting unflexed plastisol or other fluent gasket forming material 24 through a nozzle directed at the skirt 34 while rotating the cap member 22 on a turn-table, typically at a speed of 500 to 1,500 r.p.m.. After the compound 24 is deposited, it is formed into the desired shape by forming it with a molding punch 40, such as that shown in FIG. 3.

This punch 40 has a radially outwardly facing, large diameter guide surface 42, a step 44 therein, and a generally inwardly tapering, reduced diameter circumferentially extending wall portion 46. Rounded corner 48 joins the reduced diameter wall portion 46 to a generally axially facing surface 50, which forms a sealing surface in the compound 24 which will engage the top seal finish of the container. Radially inwardly of the axially facing surface 50 is a step portion 52, and, disposed radially inwardly thereof are a radially outer land 54, a radially outer groove 56, an intermediate land 58, an inner groove 60, and an innermost land 62, respectively. The innermost land 62 terminates at a generally cylindrical wall 64, which extends axially upwardly therefrom, leaving an opening 66 in the center portion of the punch 40.

Referring to FIGS. 4 and 5, it is shown that the intermediate land 58 and the inner land 62 include notches 68, 70 respectively associated therewith, the notches 68 preferably being of lesser depth or height than the radially more inwardly disposed notches 70.

Referring to FIGS. 2, 3 and 4, the configuration of the gasket material 24 is shown in the form finally assumed after the punch 40 has completed its downward movement within the cap 22. The shaped gasket comprises a skirt portion 72, which faces generally radially inwardly to form one sealing surface for engaging a side seal finish, and a generally axially facing, surface 74 for engaging the top seal finish of a container. Radially inwardly of the axially facing surface 74 is a very thin section 76 of gasket material. Further inwardly thereof is a first bead or ring 78, a second thin coating 80, and an inner bead or ring 82.

The thin sections 76, 80 are normally of a thickness of from about 0.001 to 0.005 inch, preferably 0.002 inch. The significance of these dimensions will be discussed later. Between the grooves 54, 58, and inwardly of the groove 58 are outer webs 84 and inner webs 86 respectively of gasket material, which are formed where the plastisol material moves radially in the grooves 68, 70. Normally, the thickness of the webs 84, 86 is about 0.010 up to about 0.030 inch. The inner land 62 preferably contacts or comes within 0.002 or less of contacting the inner surface of the cap member 22. The second or inner web 86 extends radially inwardly of the ring 82, but this web 86 and the ring portions immediately adjacent the web 86 are only formed in the event that sufficient compound is forced through the notch 68 to cause circumferential flow in the groove 60. Thus, the inner ring 82 is normally of intermittent or fragmentary extent, with the webs 86 being present where the ring 82 has attained full thickness or height. The extent of the ring 82 is also determined by the amount of compound used, and the disposition thereof.

Referring now to the operation of the process as the punch moves downwardly into the caps, when the punch 40 moves axially downwardly into the cap 22, the mass of sealing compound 24 is engaged by the wall 46 of the punch. A portion of the material is forced somewhat upwardly near the bead 36 of the cap and the remainder is forced downwardly into the channel 30 which forms the radially outer surface portion of the top panel 26. When the channel 30 is completely filled, excess compound tends to be forced inwardly, over the step 52 and into the groove 56. The material forced beneath the land 58 is either a rather viscous plastisol or like material, or entrapped air. If it is air, it proceeds freely radially inwardly of the punch, and is vented at the center thereof. If it is a plastisol material, the attempted passage beneath the land 58 is restricted, not only because of the narrow space between the land 58 and the inner surface of the cap 22, but because the plastisol therein may, for example, in the case of a heated punch, tend to solidify earlier than the remaining mass thereof. Thus, the excess plastisol moves radially at an extremely limited rate, or not at all, inwardly until the groove 56 is substantially full. However, in moving, the plastisol flowing circumferentially encounters the spaced apart notches 68 in the land 58, where relatively few passage is permitted by reason of the increased cross-sectional area of the passage thus formed. Material flowing through the notch 68, if present in sufficient quantity is substantially unable to pass beneath the innermost land 62, which is either in contact with or very closely spaced apart from the flat, inwardly directed surface 26 of the cap 22. Since plastisol can not flow radially inwardly because of the restriction imposed by the land 58, it is again directed into the second or inner groove 60 in a circumferential direction.

If there is more than enough plastisol to fill or substantially fill the inner groove 60, the excess is then vented, together with any air trapped therewith, radially inwardly through the second set of notches 70. Excess compound may form a plurality of second, generally radially inwardly extending spokes or webs 86, such as those shown in FIG. 2. In further reference to FIG. 2, it will be noted that a condition is illustrated wherein there was somewhat more excess compound from the left side of the cap than on the right side, as a result of which webs 86 were formed extending general inwardly of the cap, whereas, referring to the right hand side of FIG. 2 it is shown that the inner webs 86 are discontinuous and fragmentary, and that the inner ring 82 is of a smaller cross section, or fragmentary or incomplete. Although the gasket normally is quite symmetrical, gaskets lacking perfect symmetry due to uneven disposition of compound are still satisfactory, since in such case, the present method distributes the compound in a satisfactory manner, as shown. Some excess compound is always provided to assure complete filling and to prevent voids or pockmarks.

Although the size of the dimensions and exact structural features of the invention are not of critical importance, it is preferred that the outward set of notches 68 be somewhat smaller than the inner set of notches 70, and that the land 58 be spaced apart from the inner surface of the cap, in position of use, a distance somewhat greater than the spacing between the inner land 62 and the inner face of the cap 22.

The contour of the cap shown, particularly that of the channel 30, the re-entrant 32, and the exact shape or size of the skirt portion 34 are not of critical importance, and may be varied in the manner known to those skilled in the art. The contour of the punch is made after the cap contour or profile is determined so as to provide for the proper cap-to-land clearances.

Preferably, the gasket compound is in a moldable form, and, in the case of a plastisol, the vinyl resin is insoluble in the plasticizer at ambient temperature. The viscosity of the material is very high, and it will retain the shape it assumes after being placed in the shell, at least until the molding is initiated by moving the punch 40 into position. The punch may be a heated punch having a temperature of from about 250° to 400° F. Moving the punch into contact with the plasticizer serves to impart sufficient cure thereto, so that it will retain its shape, although not actually fully cured. A final cure of one to five minutes in a heated dryer or oven of 300° to 400° F. will typically be sufficient to finish curing the resin in place. In the event a foamable plastisol or other foamable composition is used, it may be cured in a similar manner, or in any other manner known to those skilled in the art. Thus, although the process of the invention normally includes one or more curing or post-curing steps, the exact material used, or the method of curing it does not form an essential aspect of the invention.

One of the principal advantages of the closure made according to the present invention is that excess compound is kept from randomly extending across the inner surface of the cap, and the rings impart a neat, geometric and esthetically pleasing appearance to the inside of the cap, while assuring that all air is vented from beneath the punch to avoid pockmarks or voids in the gasket. Thus, a combination of higher quality, greater latitude in dimensional and quantitative tolerances, and better appearance are made possible. Another advantage is that, by constructing a molding punch according to the invention, movement of the punch into the cap into a known manner, inherently performs the several manipulative steps of the process substantially simultaneously, with only one axial movement or operation. The simplicity of the method contributes to its economy and reliability, and fewer inferior or "reject" caps are made.

The spacing of the lands from the inner surface of the cap with the dimensions given herein is desired, since it is desired that the outermost groove provide substantial resistance to flow radially inwardly therefrom, whereas the same degree restriction is not needed radially inwardly of the inner groove. Thus, for a typical cap, the notch 68 may be 0.002 inch deep with respect to the land 58, whereas the notch 70 is preferably 0.005 inch deep with respect to the land 62. Staggering or circumferentially offsetting the notches 68, 70 from each other aids in the sequence of filling the grooves and notches to form the rings and webs in the closures of the present invention, and prevents uncontrolled or random forcing of compound into the center of the top panel 28.

Suitable sealing compounds for use with the invention are well known to those skilled in the art, and are, for example, of the types referred to in the Foster et al. U.S. Pat. No. 3,270,904, the Owen U.S. Pat. No. 3,360,148, and in patents referred to therein.

It will thus be seen that the present invention provides a novel gasketed closure, forming punch, and molding method having a number of advantages and characteristics including those hereinbefore pointed out, and others which are inherent in the invention.

I claim:

1. A method of forming a gasket in a shell element to form a gasketed closure unit, said method comprising disposing a ring of an at least partially fluent gasket forming compound along an inner surface of the skirt portion of a shell element, forcing said compound along said skirt portion and at least partially radially inwardly toward an outer margin portion of the top panel portion of said shell, fully filling said outer margin portion with said compound, and, while allowing air entrapped with said compound to escape both radially inwardly and circumferentially of said outer margin portion, forcing a portion of excess compound circumferentially of said outer margin portion by preventing substantial, radially inward free flow of said compound, thereafter allowing limited radial flow of compound, and again forcing a portion of said compound circumferentially before allowing free radially inward movement thereof, whereupon entrapped air is vented, and excess compound forms at least portions of two circumferential rings radially inwardly of said outer margin portion of said shell element.

2. A method as defined in claim 1 in which allowing air entrapped with said compound to escape includes the step of moving compound flow restricting means closely adjacent said top panel portion of said shell a distance such that air may escape through said distance, but wherein sealing compound tending to flow therethrough is substantially solidified and will not flow therethrough.

3. A method of simultaneously forming a gasket in a shell member to produce a gasketed closure unit and venting air entrapped with a mass of gasket-forming compound disposed on the skirt portion and a radially outer margin of the top panel portion of said shell member, said method comprising first moving a molding punch into a closely overlying relation to said mass of material, preventing free radially inward flow of material by surrounding a periphery of said material with a plurality of lands containing venting notches therein and forming a plurality of concentric, circular grooves, further axially moving said punch to a position wherein said lands substantially engage the inner surface of said top panel, whereby air may be vented from between said lands and said inner surface, and said compound and additional air may pass through said notches, while said compound is forced circumferentially in said grooves between said notches.

4. A method as defined in claim 3 in which said venting notches in the outermost land are of a lesser depth than said venting notches in the innermost land.

* * * * *